US010045088B2

(12) United States Patent
Hall

(10) Patent No.: US 10,045,088 B2
(45) Date of Patent: Aug. 7, 2018

(54) METHOD AND APPARATUS FOR DISTRIBUTING CONTENT LOCALLY

(71) Applicant: AT&T Intellectual Property I, LP, Atlanta, GA (US)

(72) Inventor: Robert J. Hall, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/502,264

(22) Filed: Sep. 30, 2014

(65) Prior Publication Data
US 2016/0094891 A1   Mar. 31, 2016

(51) Int. Cl.
*H04N 7/173* (2011.01)
*H04N 21/61* (2011.01)
*H04N 21/254* (2011.01)
*H04N 21/462* (2011.01)
*H04N 21/643* (2011.01)
*H04H 20/63* (2008.01)
*H04H 40/90* (2008.01)

(52) U.S. Cl.
CPC ..... *H04N 21/6193* (2013.01); *H04N 21/2542* (2013.01); *H04N 21/4622* (2013.01); *H04N 21/64315* (2013.01); *H04H 20/63* (2013.01); *H04H 40/90* (2013.01)

(58) Field of Classification Search
USPC ......................................................... 725/68
See application file for complete search history.

(56) References Cited

U.S. PATENT DOCUMENTS

| | | | | |
|---|---|---|---|---|
| 5,898,456 A | * | 4/1999 | Wahl | H04N 7/17318 348/E7.071 |
| 7,028,096 B1 | * | 4/2006 | Lee | H04N 7/17336 348/E7.073 |
| 7,130,908 B1 | | 10/2006 | Pecus et al. | |
| 8,077,877 B1 | * | 12/2011 | Martin | G06Q 30/02 379/37 |

(Continued)

OTHER PUBLICATIONS

Golrezaei, Negin et al., "FemtoCaching: Wireless Video Content Delivery through Distributed Caching Helpers", INFOCOM, 2012 Proceedings IEEE.

(Continued)

*Primary Examiner* — Mushfikh Alam
(74) *Attorney, Agent, or Firm* — Guntin & Gust, PLLC; Matthew Tropper

(57) ABSTRACT

Aspects of the subject disclosure may include, for example, a content distribution device that receives a signal stream from a satellite including items of media content. The device selectively stores a first subset of the media content items at a storage device, according to a characteristic of a location proximate to the device. The device selectively stores a second subset of the items according to a history of user requests for content transmitted in proximity to the content distribution device. The device receives a request from a consumer device for an item in the first subset or the second subset, retrieves the item, and transmits the item to the consumer device via a wireless access channel. The transmitting is performed according to a short range wireless protocol without utilizing a long range wireless protocol. Other embodiments are disclosed.

20 Claims, 9 Drawing Sheets

(56) References Cited

U.S. PATENT DOCUMENTS

| | | | |
|---|---|---|---|
| 8,505,057 B2 | 8/2013 | Rogers | |
| 8,612,550 B2 | 12/2013 | Yoo et al. | |
| 8,806,530 B1* | 8/2014 | Izdepski | H04N 21/258 725/141 |
| 2001/0014975 A1* | 8/2001 | Gordon | H04N 7/17354 725/91 |
| 2004/0078813 A1* | 4/2004 | Kobuya | G01C 21/20 725/46 |
| 2005/0193414 A1* | 9/2005 | Horvitz | H04N 21/482 725/46 |
| 2005/0251827 A1* | 11/2005 | Ellis | H04N 5/44543 725/47 |
| 2008/0141314 A1* | 6/2008 | Lemond | H04B 7/18506 725/76 |
| 2009/0044217 A1* | 2/2009 | Lutterbach | H04H 20/103 725/34 |
| 2009/0138931 A1 | 5/2009 | Lin et al. | |
| 2009/0144417 A1 | 6/2009 | Kisel et al. | |
| 2009/0288122 A1* | 11/2009 | Zellner | H01Q 9/30 725/64 |
| 2010/0005489 A1* | 1/2010 | Losey | G06Q 30/02 725/35 |
| 2010/0057894 A1 | 3/2010 | Glasser | |
| 2010/0080163 A1* | 4/2010 | Krishnamoorthi | H04L 12/189 370/312 |
| 2010/0121945 A1 | 5/2010 | Gerber et al. | |
| 2010/0146567 A1* | 6/2010 | Mehta | H04N 7/17318 725/91 |
| 2010/0154021 A1* | 6/2010 | Howarter | H04N 21/4126 725/141 |
| 2010/0158109 A1* | 6/2010 | Dahlby | H04N 7/17318 375/240.03 |
| 2010/0169937 A1* | 7/2010 | Atwal | H04L 45/123 725/68 |
| 2010/0211442 A1* | 8/2010 | Venkataraman | G06F 17/30029 705/14.5 |
| 2011/0040861 A1 | 2/2011 | Van der Merwe et al. | |
| 2011/0231767 A1* | 9/2011 | Russell | G06F 17/3087 715/733 |
| 2011/0231873 A1* | 9/2011 | Toebes | H04N 21/252 725/35 |
| 2012/0144421 A1* | 6/2012 | Kuroda | G06Q 30/02 725/36 |
| 2012/0203628 A1* | 8/2012 | DeCaro | G06Q 30/0252 705/14.49 |
| 2013/0144750 A1 | 6/2013 | Brown | |
| 2013/0166302 A1* | 6/2013 | Mercado | G10L 21/00 704/251 |
| 2014/0019576 A1 | 1/2014 | Lobo et al. | |
| 2014/0052810 A1 | 2/2014 | Osorio et al. | |
| 2014/0282703 A1* | 9/2014 | Garg | H04N 21/814 725/33 |
| 2015/0040159 A1* | 2/2015 | Yuan | H04N 21/458 725/40 |
| 2015/0121415 A1* | 4/2015 | Lee | H04N 21/25816 725/25 |
| 2015/0237389 A1* | 8/2015 | Grouf | H04N 21/26283 725/49 |
| 2015/0245094 A1* | 8/2015 | Schneider | H04N 21/44016 725/34 |
| 2016/0007053 A1* | 1/2016 | Mao | H04N 21/21815 725/90 |
| 2016/0055420 A1* | 2/2016 | Karanam | G16H 50/30 700/52 |

OTHER PUBLICATIONS

Mokhtarian, Kianoosh et al., "Caching in Video CDNs: Building Strong Lines of Defense", EuroSys 2014, Apr. 13-16, 2014, Amsterdam, Netherlands.

Paul, Sanjoy et al., "The Cache-and-Forward Network Architecture for Efficient Mobile Content Delivery Services in the Future Internet", Innovations in NGN: Future Network and Services, 2008. K-INGN 2008. First ITU-T Kaleidoscope Academic Conference.

* cited by examiner

100

300

400

METHOD AND APPARATUS FOR DISTRIBUTING CONTENT LOCALLY

FIELD OF THE DISCLOSURE

The subject disclosure relates to a method and apparatus for distributing content locally.

BACKGROUND

Television content is desirable to consumers and profitable to television providers. Accordingly, an important category of large-content files are files containing recordings of television shows or movies shown on a television channel. WiFi systems, for example systems using the IEEE 802.11ac protocol, can transfer data to a consumer device over short distances at higher rates than 4G/LTE systems.

BRIEF DESCRIPTION OF THE DRAWINGS

Reference will now be made to the accompanying drawings, which are not necessarily drawn to scale, and wherein.

DETAILED DESCRIPTION

Figure 1:
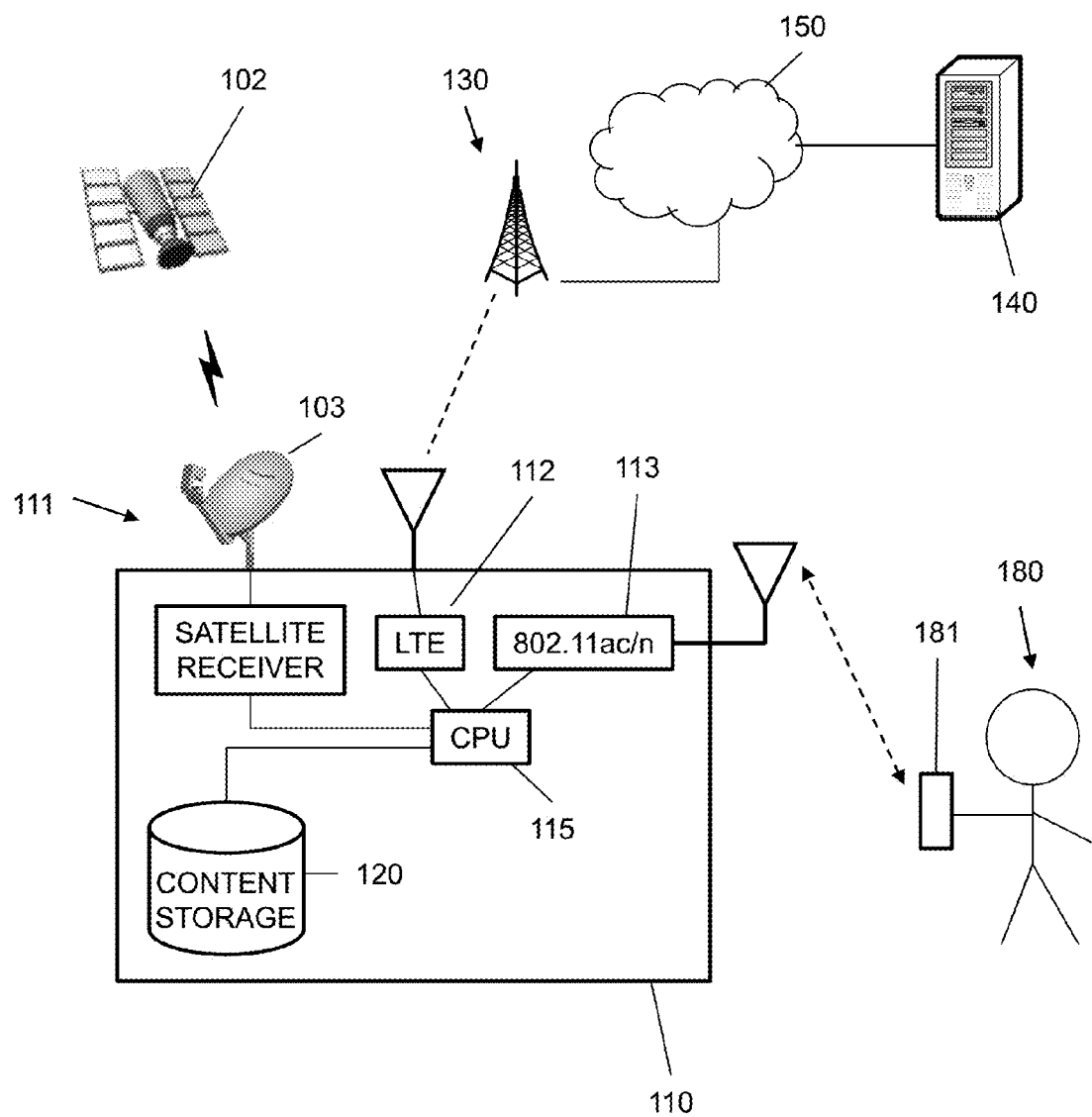
FIG. 1 schematically illustrates an edge cache including a satellite receiver, in accordance with an embodiment of the disclosure.

The subject disclosure describes, among other things, illustrative embodiments for an edge cache storing content acquired via a satellite receiver and delivering content to consumers via a high-speed wireless transceiver subsystem. Other embodiments are described in the subject disclosure.

One or more aspects of the subject disclosure include selecting a channel for receiving content via a satellite receiver; and storing and distributing content selected according to a characteristic of the location of the cache (specifically, types of commercial establishments in proximity to the cache) and according to past customer requests submitted to the cache.

One embodiment of the subject disclosure includes a content distribution device comprising a processor, a receiver coupled to the processor and including a satellite antenna, a storage device for locally storing media content, and a memory for storing executable instructions. The instructions, when executed by the processor, facilitate performance of operations. The operations comprise determining a channel for receiving from a satellite a signal stream comprising a plurality of items of media content, and receiving the signal stream via the channel. The operations also comprise selectively storing a first subset of the plurality of items of media content at the storage device in accordance with a characteristic of a location in proximity to the content distribution device, and selectively storing a second subset of the plurality of items of media content at the storage device in accordance with a history of user requests for content that were transmitted in proximity to the content distribution device. The operations further comprise receiving a request from a communication device for an item in the first subset or the second subset of the plurality of items of media content, and transmitting to the communication device the item retrieved from the first subset or the second subset of the plurality of items of media content via a wireless access channel; the transmitting is performed according to a short range wireless protocol without utilizing a long range wireless protocol.

One embodiment of the subject disclosure includes a computer-readable storage device in a content distribution device, comprising instructions which, responsive to execution by a processor, cause the processor to perform operations. The operations comprise receiving from a satellite a signal stream comprising a plurality of items of media content. The operations also comprise selectively storing a first subset of the plurality of items of media content at the storage device in accordance with a characteristic of a location in proximity to the content distribution device, and selectively storing a second subset of the plurality of items of media content at the storage device in accordance with a history of user requests for content that were transmitted in proximity to the content distribution device. The operations also comprise receiving a request from a communication device for the signal stream or for an item in the first subset or the second subset of the plurality of items of media content, and transmitting to the communication device via a wireless access channel, in accordance with the request, the signal stream or the item retrieved from the first subset or the second subset of the plurality of items of media content; the transmitting is performed according to a short range wireless protocol without utilizing a long range wireless protocol.

One embodiment of the subject disclosure includes a method comprising receiving, by a content distribution device comprising a processor, a signal stream from a satellite comprising a plurality of items of media content. The method also includes selectively storing a first subset of the plurality of items of media content at a storage device of the content distribution device, in accordance with a characteristic of a location in proximity to the content distribution device, and selectively storing a second subset of the plurality of items of media content at the storage device in accordance with a history of user requests for content that were transmitted in proximity to the content distribution device. The method also includes receiving a request from a consumer device for an item in the first subset or the second subset of the plurality of items of media content, and transmitting to the consumer device the item retrieved from the first subset or the second subset of the plurality of items of media content via a wireless access channel; the transmitting is performed according to a short range wireless protocol without utilizing a long range wireless protocol.

FIG. 1 schematically illustrates a system 100 including an edge cache with a satellite receiver, in accordance with an embodiment of the disclosure. Edge cache 110 includes a satellite receiver subsystem 111 with an antenna unit 103 (e.g. a dish located on the roof of the premises) receiving a stream of content (e.g. television shows) from a content provider via satellite 102. A central processing unit (CPU) 115 executes software for selecting, storing and distributing the content. The CPU is coupled to a local storage device 120 for storing items of media content. The CPU is also coupled to a high-speed wireless transceiver subsystem 113 for transmitting content to a device 181 of consumer 180. In an embodiment, wireless transceiver subsystem 113 provides content according to the IEEE 802.11ac protocol. In another embodiment, wireless transceiver subsystem 113 provides content according to the IEEE 802.11n protocol. Both of these protocols can be characterized as short-range wireless protocols, providing coverage over an indoor range of approximately 70 m. When used outdoors or in other large, relatively clear areas, they can be characterized as medium-range wireless protocols.

In this embodiment, edge cache 110 also includes an LTE transceiver subsystem 112 that can communicate with LTE system 130. The LTE system 130 can communicate with an e-commerce server 140 via a network 150. The consumer 180 can thus use device 181 to communicate with the e-commerce server 140 through the edge cache to purchase, lease, or otherwise obtain authorization to receive media content from the edge cache via the high-speed wireless transceiver subsystem 113. In another embodiment, content is delivered via cable, and the consumer 180 obtains content by plugging the cable into device 181.

In a particular embodiment, consumer 180 interacts with the edge cache via an application or web page. The application can manage terms and conditions regarding usage of the media content. For example, the application can delete the content from the consumer's device on expiration of a rental period. In a further embodiment, e-commerce server 140 provides a decryption key as part of the purchase/lease/authorization transaction; traffic related to the transaction is routed over the LTE system through the edge cache.

The content provider can have a dedicated satellite channel (not a broadcast channel) providing content only for the edge cache. In an embodiment, the content provider transmits content from satellite 102 over multiple channels, and the CPU 115 (executing software local to the edge cache) selects the channel to be received at receiver subsystem 111. The channel can be selected based on a type of content associated with that channel (the channel identifier indicating the content type), the content being currently delivered (from monitoring the satellite signal stream), the time of day (according to a program schedule for the channel), or some other criterion. In this embodiment, the edge cache stores all content received over the selected channel. In other embodiment (discussed in more detail below), the edge cache stores a selection of content based on additional criteria.

In an embodiment, satellite receiver 111 continuously monitors a programmed sequence of shows, and records them to the storage device 120. In a particular embodiment, the stored content files are encrypted, so that only authorized users can view a show. The edge cache 110 can include a plurality of satellite receiver subsystems 111 in order to capture signal streams on multiple channels. Instead of receiving stored edge cache content (e.g. by a purchase contract), the consumer 180 can contract to receive content streamed to device 181 as the content is received from the satellite. In this instance, the consumer can have real-time access to the satellite feed at device 181.

Figure 2:
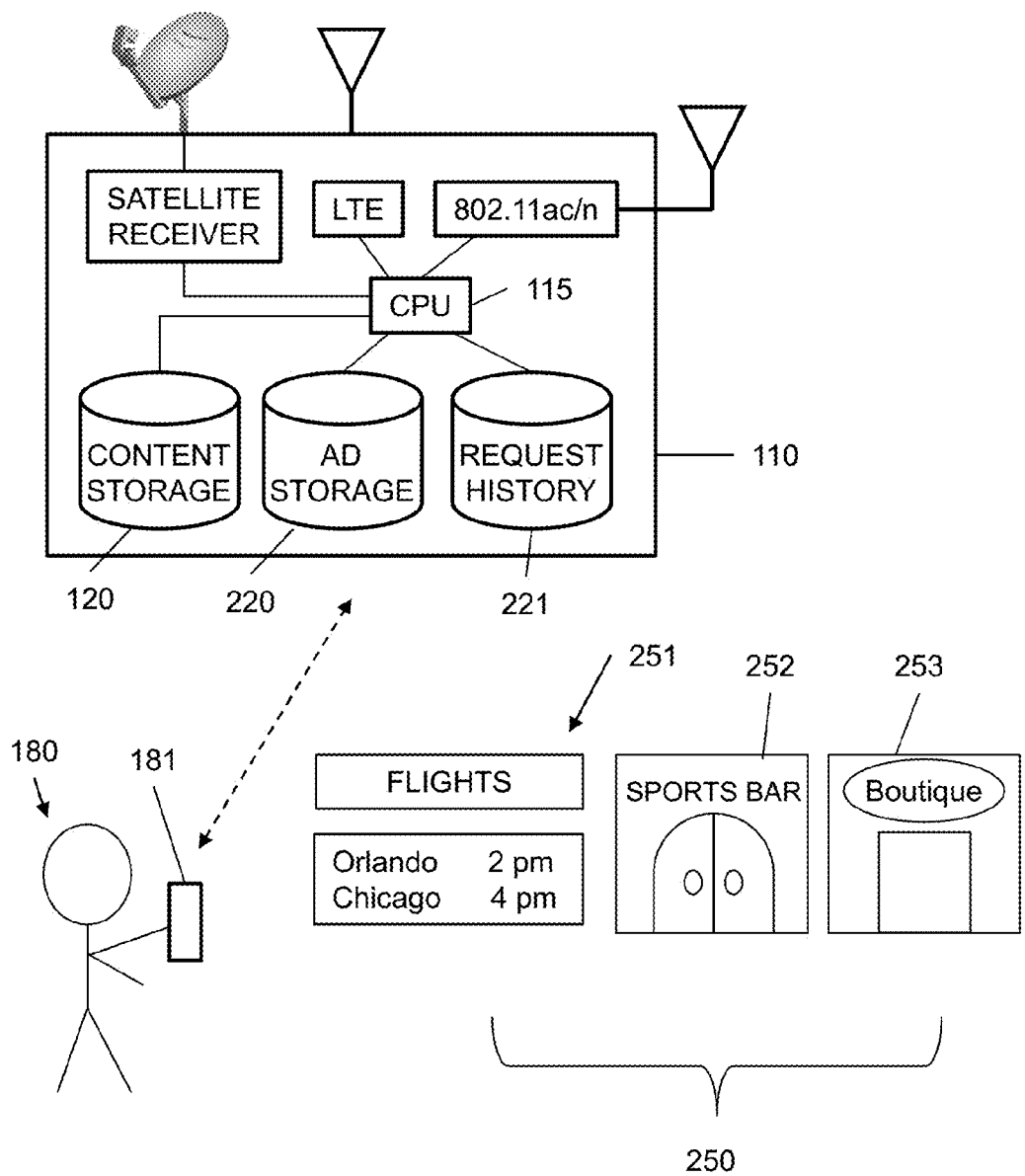
FIG. 2 depicts an illustrative embodiment of an edge cache in proximity to commercial establishments.

Satellite-based edge cache 110 can be advantageously located wherever a large number of consumers gather but high-bandwidth Internet access may not be available (e.g. airports, sports venues, theme parks, cruise ships). FIG. 2 depicts an illustrative embodiment 200 where edge cache 110 is located in an airport terminal 250, in proximity to a flight information display 251 (for example, at a gate) and also in proximity to a location having specific characteristics (for example, commercial establishments 252, 253).

In this embodiment, consumer 180 and device 181 are located within the WiFi transmission range of edge cache 110, and the consumer is also located near establishments 252, 253. The consumer accordingly may prefer to request media content consistent with the type of establishment. For example, if the consumer is a patron of sports bar 252, the consumer may be likely to request content from the edge cache storage related to sports. If the consumer instead is a patron of boutique 253, the consumer may be likely to request content relating to fashion. The CPU of the edge cache can select content items relating to both sports and fashion for storage in storage device 120.

The type of content that may be of interest to the consumer can change with time. For example, a consumer near display 251 who is waiting for a flight to Orlando may be likely to request content by The Walt Disney Company; two hours later (in advance of a flight to Chicago), a consumer at the same location may be likely to request content related to Chicago (for example, a White Sox game).

In another embodiment, the edge cache can store past consumer requests, in local storage 221, analyze the consumer request history according to type of content, and select content for storage consistent with the request history.

In a further embodiment, the edge cache can maintain a local storage 220 of advertisements to insert into the content transmitted to the consumer. In some embodiments, the advertising content can be video content, so that the advertising is loadable using the satellite receiver in the way that the requested content is loaded. In one embodiment, the advertising may be recorded commercials transmitted in the normal broadcast stream. The subject matter of the advertising can be selected based on the type of nearby establishments. In particular, the establishments 252, 253 can have advertisements for themselves included in the content transmitted to the consumer. In other embodiments, the edge cache stores and retrieves advertising with subject matter consistent with the current consumer request or the history of requests by consumers at the edge cache location.

Figure 3:
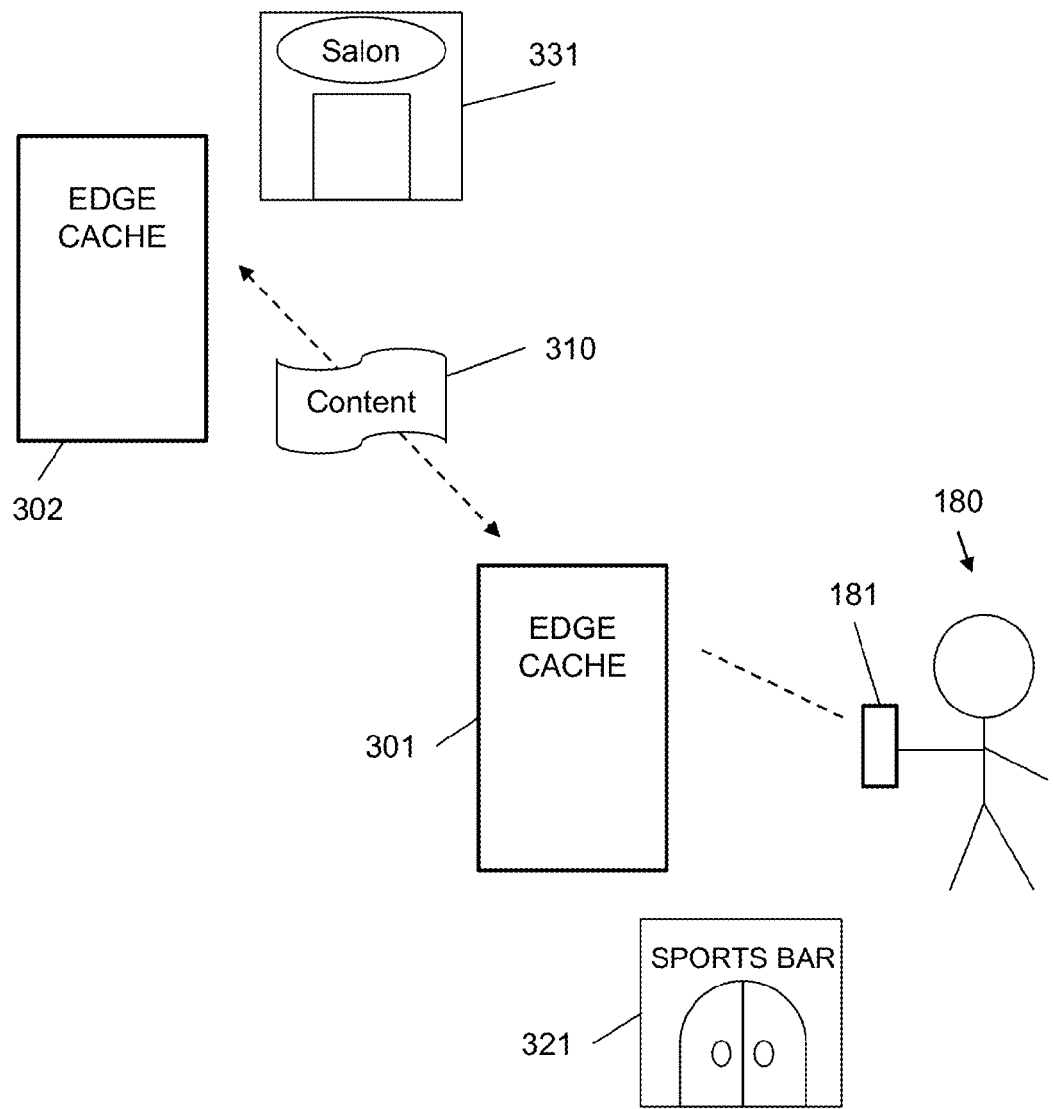
FIG. 3 depicts an illustrative embodiment of two edge caches in proximity to different commercial establishments.

FIG. 3 depicts an illustrative embodiment 300 in which two edge caches 301, 302 are remote from each other but can communicate over a high-speed wireless transceiver (not necessarily by IEEE 802.11ac or IEEE 802.11n). In this embodiment, edge caches 301, 302 transfer content between them to respond to local consumer requests. For example, edge cache 301 (located near sports bar 321) has selectively stored content relating to sports. If consumer 180 sends (via device 181) a request to edge cache 301 for content related to cosmetics, that content may not be available in the local storage of edge cache 301. Edge cache 301 can then forward the request to edge cache 302, which is located near salon 331, and therefore has selectively stored content related to cosmetics. Edge cache 302 can then send the requested content 310 to edge cache 301 for transmission to the consumer.

Figure 4:
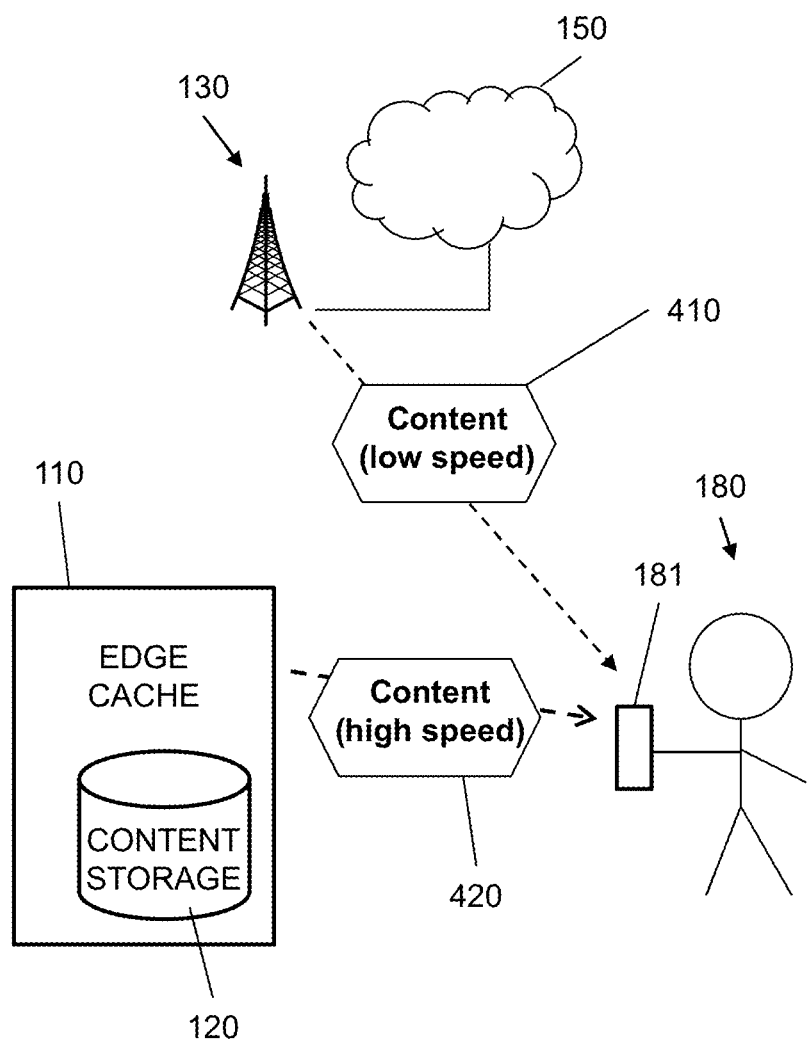
FIG. 4 depicts an illustrative embodiment of obtaining content from an edge cache in preference to an LTE system.

FIG. 4 depicts an illustrative embodiment 400 in which a consumer obtaining content via an LTE system switches to the edge cache in order to obtain the content at a higher speed. In this embodiment, an application executing on consumer device 181 monitors the transfer progress of an item of content 410 requested via the LTE system 130. If, during this transfer, the consumer comes within transmission range of edge cache 110, the device 181 can detect the edge cache and request the same item of content. If the requested content is available (stored locally in storage device 120), the content 420 from the edge cache can be transmitted to the consumer device at a higher speed than via the LTE system.

In an embodiment, the consumer device 181 requests the content from the edge cache only if the transfer speed via the LTE falls below a threshold. In another embodiment, the consumer device can suspend the LTE transfer upon sending the request to the edge cache, and can include in the request a bookmark indicating the point in the content where the transfer was suspended. The edge cache can then retrieve and transmit the portion of content not yet transferred via the LTE system, to avoid duplicate transfer of content and enable the consumer to obtain the complete item of content promptly. In another embodiment, if a user starts a local download using WiFi and subsequently moves out of the WiFi range of the edge cache, the download can be continued where it was left off, using LTE.

Figure 5:
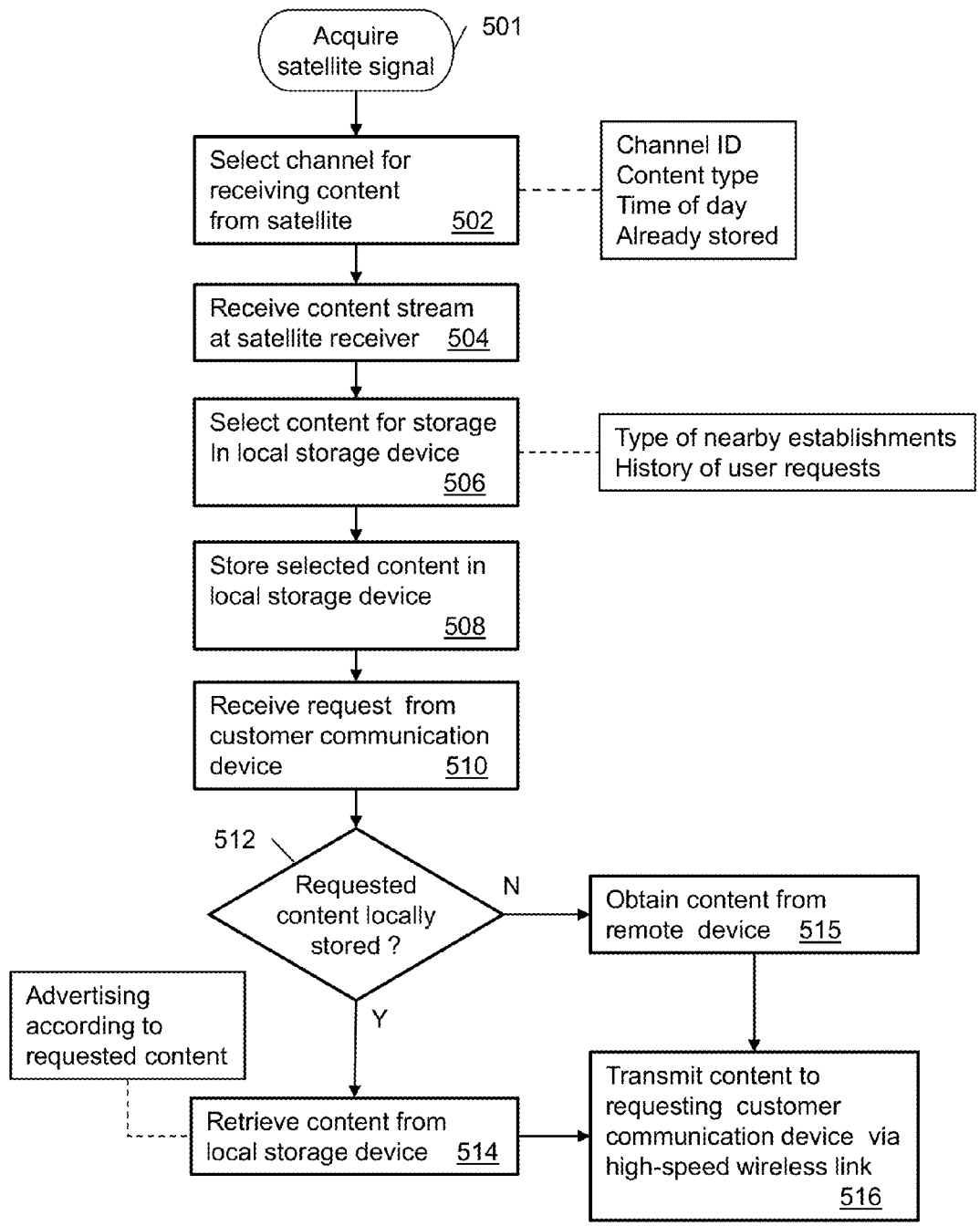
FIG. 5 depicts an illustrative embodiment of a method used by an edge cache as shown in FIGS. 1-4.

FIG. 5 depicts an illustrative embodiment of a method 500 used by an edge cache as shown in FIGS. 1-4. The edge cache acquires the satellite signal using the satellite receiver subsystem (step 501). The edge cache processor (e.g. CPU 115) selects a channel for receiving content from the satellite (step 502); the selection can be made based on criteria such as the identity of the channel, the type of content being provided on the channel, the time of day, or whether the content currently being provided is already stored in the edge cache. The content stream on the selected channel is received by the satellite receiver subsystem (step 504).

The edge cache processor can then select content for local storage, based on criteria such as the type of establishments located near the edge cache and the history of consumer requests (step 506). The selected content is stored in the local storage device local of the edge cache (step 508). When a request for a content item is received from a consumer device (step 510), the processor determines whether the content item is available at the local storage device (step 512). If so, the content is retrieved from the local storage device (step 514) and transmitted to the consumer device via the high-speed wireless transceiver subsystem (step 516). In particular embodiments, advertising content is selected and retrieved from local advertising storage and transmitted to the consumer device along with the requested content.

If the requested content is not locally stored, the edge cache sends a request to one or more remote edge caches to obtain the content (step 515). The edge cache then receives the content from the remote edge cache and transmits the content to the consumer device (step 516).

Figure 6:
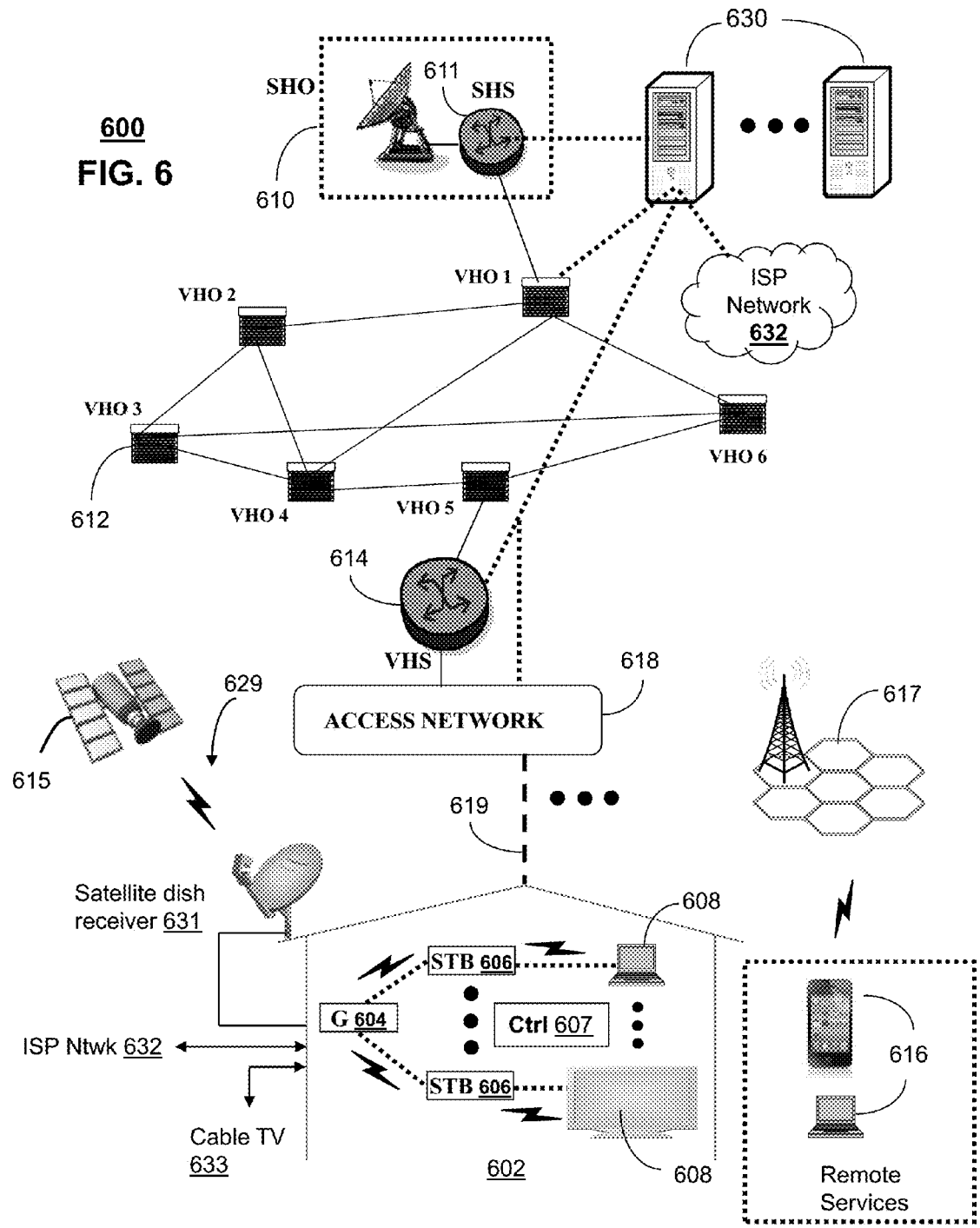
FIGS. 6-7 depict illustrative embodiments of communication systems that provide media services.

FIG. 6 depicts an illustrative embodiment of a first communication system 600 for delivering media content. The communication system 600 can represent an Internet Protocol Television (IPTV) media system. Communication system 600 can be overlaid or operably coupled with systems 100 and/or 200 in FIGS. 1 and/or 2 as another representative embodiment of communication system 600. For instance, one or more devices illustrated in the communication system 600 of FIG. 6 can function as a content distribution device comprising a processor, a receiver coupled to the processor and including a satellite antenna, a storage device for locally storing media content, and a memory for storing executable instructions. The instructions, when executed by the processor, facilitate performance of operations. The operations comprise determining a channel for receiving from a satellite a signal stream comprising a plurality of items of media content, and receiving the signal stream via the channel. The operations also comprise selectively storing a first subset of the plurality of items of media content at the storage device in accordance with a type of commercial establishment in proximity to the content distribution device, and selectively storing a second subset of the plurality of items of media content at the storage device in accordance with a history of user requests for content that were transmitted in proximity to the content distribution device. The operations further comprise receiving a request from a communication device for an item in the first subset or the second subset of the plurality of items of media content, and transmitting to the communication device the item retrieved from the first subset or the second subset of the plurality of items of media content via a wireless access channel, wherein the transmitting is performed according to a short range wireless protocol without utilizing a long range wireless protocol.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a content distribution device. The device 630 can use computing and communication technology to perform receiving, selecting, storing, and transmitting functions, which can include among other things, the functions described by method 500 of FIG. 5. The media processors 606 and wireless communication devices 616 can be provisioned with software functions to utilize the services of device 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
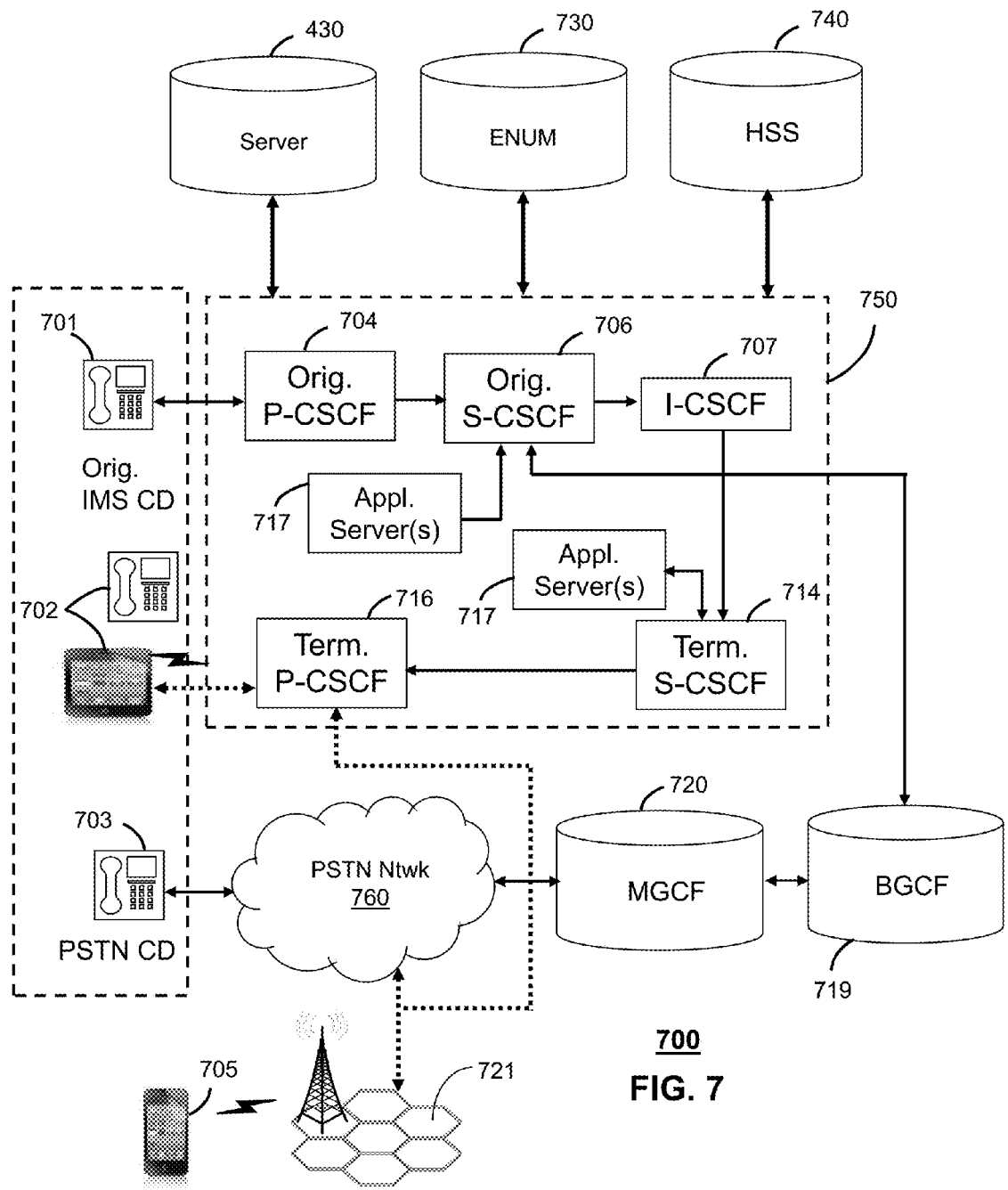

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with systems 100 and/or 200 of FIGS. 1 and/or 2 and communication system 600 as another representative embodiment of communication system 600. In particular, the system can be configured to perform a method that includes receiving, by a content distribution device comprising a processor, a signal stream from a satellite comprising a plurality of items of media content. The method also includes selectively storing a first subset of the plurality of items of media content at a storage device of the content distribution device, in accordance with a characteristic of a location in proximity to the content distribution device, and selectively storing a second subset of the plurality of items of media content at the storage device in accordance with a history of user requests for content that were transmitted in proximity to the content distribution device. The method also includes receiving a request from a consumer device for an item in the first subset or the second subset of the plurality of items of media content, and transmitting to the consumer device the item retrieved from the first subset or the second subset of the plurality of items of media content via a wireless access channel; the transmitting is performed according to a short range wireless protocol without utilizing a long range wireless protocol.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The device 630 of FIG. 6 can be operably coupled to communication system 700 for purposes similar to those described above. CDs 701, 702, 703 and 705, can be adapted with software to utilize the services of the device 630. Device 630 can be an integral part of the application server(s) 717, which can be adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
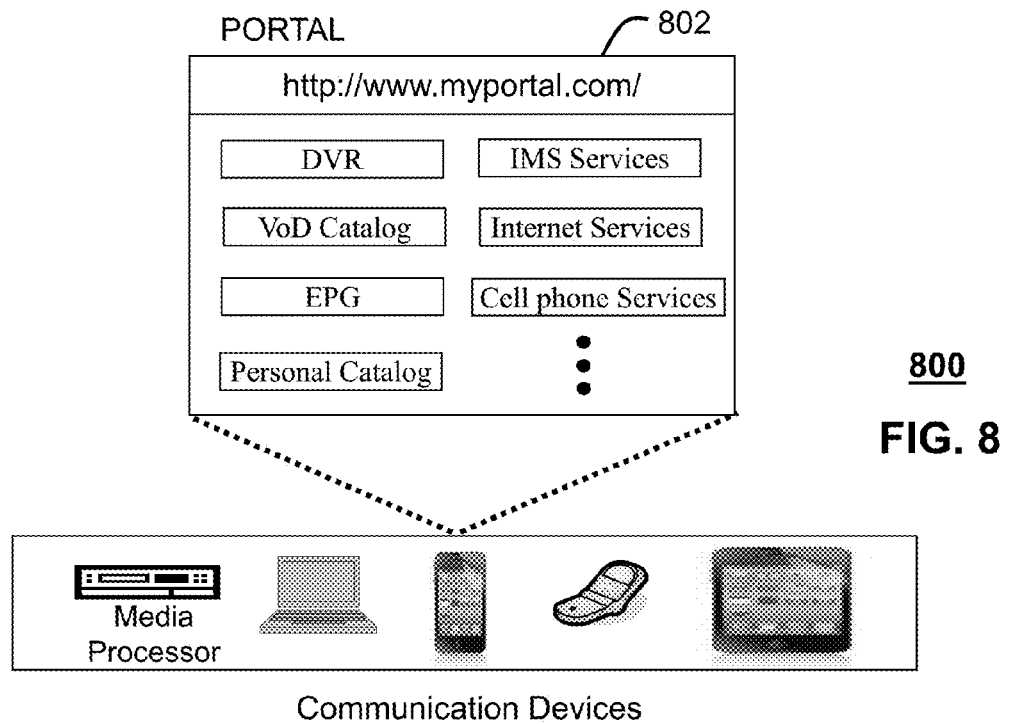
FIG. 8 depicts an illustrative embodiment of a web portal for interacting with the communication systems of FIGS. 6 and 7.

FIG. 8 depicts an illustrative embodiment of a web portal 802 of a communication system 800. Communication system 800 can be overlaid or operably coupled with [systems 100 and/or 200 of FIGS. 1 and/or 2, communication system 600, and/or communication system 700 as another representative embodiment of communication system 600 and/or communication system 700. The web portal 802 can be used for managing services of communication systems 600-700. A web page of the web portal 802 can be accessed by a Uniform Resource Locator (URL) with an Internet browser using an Internet-capable communication device such as those described in FIGS. 1 and/or 2 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

Figure 9:
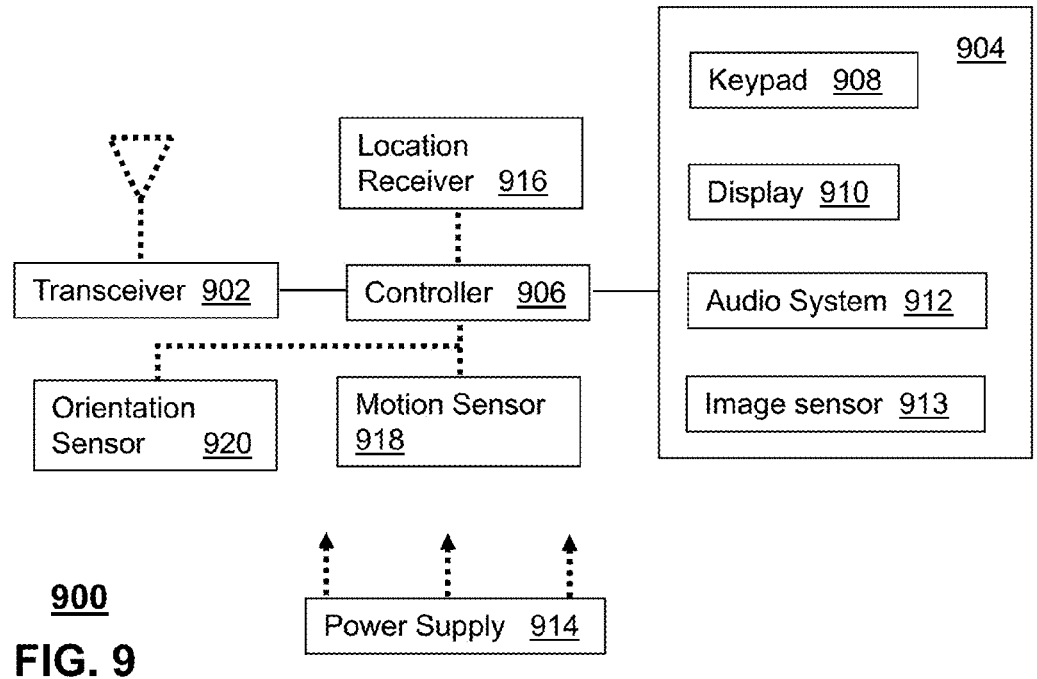
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1 and/or 2, and FIGS. 6-7. Communication device 900 in whole or in part can represent any of the communication devices described in FIGS. 1/2 and 6-7 and can be configured to perform portions of method 500 of FIG. 5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 1 and/or 2, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems 100 and/or 200 of FIGS. 1 and/or 2, communication systems 600-700 of FIGS. 6-7 such as a gaming console and a media player.

The communication device 900 shown in FIG. 9 or portions thereof can serve as a representation of one or more of the devices of system 100 and/or 200 of FIGS. 1 and/or 2, communication system 600, and communication system 700.

Upon reviewing the aforementioned embodiments, it would be evident to an artisan with ordinary skill in the art that said embodiments can be modified, reduced, or enhanced without departing from the scope of the claims described below. For example, the consumer may add an edge cache service to a standard satellite television subscription. In a case where the content stored on the edge cache is encrypted, the consumer is provided with a decryption key as part of the purchase or rental transaction to obtain the content. The transaction may authorize the consumer to access the content for only a limited time; accordingly, the decryption key may expire at the end of the contracted period. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
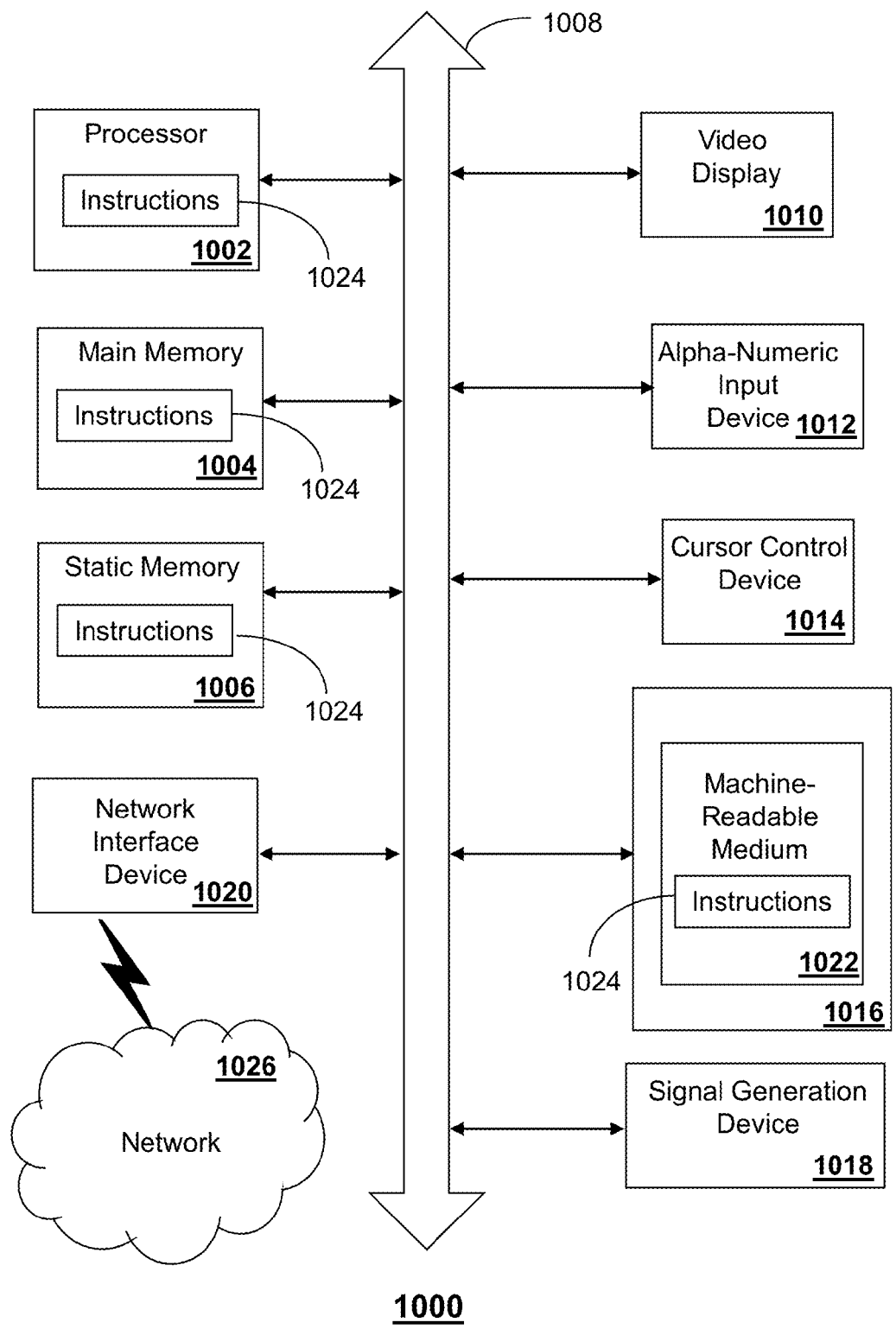
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A content distribution device comprising:
a processor;
a receiver coupled to the processor and including a satellite antenna;
a storage device for locally storing media content; and
a memory that stores executable instructions which, when executed by the processor, facilitate performance of operations, the operations comprising:
determining a channel for receiving from a satellite a signal stream comprising a plurality of items of media content;
receiving the signal stream via the channel;
selectively storing a first subset of the plurality of items of media content at the storage device without storing another subset of the plurality of items of media content in accordance with a destination presented on a display at a gate of a transportation terminal, wherein the selectively storing results in a stored plurality of items of media content, wherein the destination varies with time, and wherein each of the stored plurality of items of media content is selectively stored based on determining that each of the stored plurality of items of media content comprises a sporting event that occurs at the destination;
selectively storing a second subset of the plurality of items of media content at the storage device in accordance with a history of user requests for content that were transmitted from a location within an environment of the content distribution device;
receiving a request from a communication device for a requested item in the first subset or the second subset of the plurality of items of media content; and
transmitting, responsive to the request, the requested item to the communication device, wherein the requested item is retrieved from the first subset or the second subset of the plurality of items of media content and transmitted via a wireless access channel, wherein the requested item is transmitted to the communication device only in response to the request, and only from storage from one of the first subset and the second subset of the plurality of items of media content, and wherein the transmitting is performed according to a short range wireless protocol without utilizing a long range wireless protocol.

2. The content distribution device of claim 1, wherein the request from the communication device includes a request for content not locally stored, and wherein the operations further comprise:
transmitting a request for the content not locally stored to another content distribution device located outside a communication range of the content distribution device; and
receiving the content not locally stored from the other content distribution device.

3. The content distribution device of claim 2, wherein the operations further comprise:
selecting advertising content in accordance with a type of media content in the request from the communication device; and
retrieving the advertising content from the storage device, wherein the transmitting further comprises transmitting the advertising content to the communication device via the wireless access channel.

4. The content distribution device of claim 1, wherein the transportation terminal is an airport terminal and wherein the destination is of an airline flight leaving from the gate.

5. The content distribution device of claim 1, wherein the operations further comprise routing, through the content distribution device, messages between the communication device and a remote e-commerce server, the messages comprising a transaction to obtain authorization for the communication device to access the media content.

6. The content distribution device of claim 5, wherein the e-commerce server is accessible via an LTE system, and wherein the routing is performed using an LTE transceiver coupled to the processor.

7. The content distribution device of claim 1, wherein the selectively storing the first subset of the plurality of items of media content further comprises selecting items of media content in accordance with a time of day.

8. The content distribution device of claim 1, wherein the request from the communication device includes a bookmark associated with the requested item identifying a first portion of the requested item already obtained by the communication device and a second portion of the requested item not yet obtained by the communication device, and wherein the transmitting further comprises transmitting only the second portion of the requested item to the communication device.

9. The content distribution device of claim 1, wherein the short range wireless protocol is IEEE 802.11ac or IEEE 802.11n.

10. A non-transitory computer-readable storage medium in a content distribution device, the non-transitory computer-readable storage medium comprising instructions which, responsive to execution by a processor, cause the processor to perform operations, the operations comprising:

receiving from a satellite a signal stream comprising a plurality of items of media content;

selectively storing a first subset of the plurality of items of media content at the content distribution device without storing another subset of the plurality of items of media content in accordance with a destination that is displayed at a gate of a transportation terminal, wherein the selectively storing results in a stored plurality of items of media content, wherein the destination changes over time and wherein each of the stored plurality of items of media content is selectively stored based on determining that each of the stored plurality of items of media content comprises a sporting event that occurs at the destination;

selectively storing a second subset of the plurality of items of media content at the content distribution device in accordance with a history of user requests for content that were transmitted from a location within an environment of the content distribution device;

receiving a request from a communication device for a requested item in the first subset or the second subset of the plurality of items of media content; and transmitting to the communication device via a wireless access channel, in accordance with the request, the requested item that is retrieved from the first subset or the second subset of the plurality of items of media content, wherein the requested item is transmitted to the communication device only in response to the request, and only from storage from one of the first subset and the second subset of the plurality of items of media content, and wherein the transmitting is performed according to a short range wireless protocol without utilizing a long range wireless protocol.

11. The non-transitory computer-readable storage medium of claim 10, wherein the request from the communication device includes a request for content not locally stored, and wherein the operations further comprise:

transmitting a request for the content not locally stored to a remote other content distribution device; and receiving the content not locally stored from the other content distribution device.

12. The non-transitory computer-readable storage medium of claim 10, wherein the signal stream is received from the satellite via a preselected channel other than a broadcast channel.

13. The non-transitory computer-readable storage medium of claim 10, wherein the operations further comprise routing, through the content distribution device, messages between the communication device and a remote e-commerce server, the messages comprising a transaction to obtain authorization for the communication device to access the media content, and wherein the processor comprises multiple processors operating in a distributed processing environment.

14. The non-transitory computer-readable storage medium of claim 13, wherein the e-commerce server is accessible using the long range wireless protocol, and wherein the routing is performed using a receiver coupled to the processor operating according to the long range wireless protocol.

15. A method comprising:

receiving, by a content distribution device comprising a processor, a signal stream from a satellite, the signal stream comprising a plurality of items of media content;

selectively storing, by the content distribution device, a first subset of the plurality of items of media content at a storage device of the content distribution device, wherein the selectively storing is performed in accordance with a destination that is displayed on a display at a gate of a transportation terminal, wherein the selectively storing results in a stored plurality of items of media content, wherein the destination varies with time and wherein each of the stored plurality of items of media content is selectively stored based on determining that each of the stored plurality of items of media content comprises a sporting event that occurs at the destination;

selectively storing, by the content distribution device, a second subset of the plurality of items of media content at the storage device in accordance with a history of user requests for content that were transmitted from a location within an environment of the content distribution device;

receiving, by the content distribution device, a request from a consumer device for a requested item in the first subset or the second subset of the plurality of items of media content; and transmitting by the content distribution device to the consumer device, responsive to the request, the requested item, wherein the requested item is retrieved from the first subset or the second subset of the plurality of items of media content and transmitted via a wireless access channel, wherein the requested item is transmitted to the consumer device only in response to the request, and only from storage from one of the first subset and the second subset of the plurality of items of media content, and wherein the transmitting is performed according to a short range wireless protocol without utilizing a long range wireless protocol.

16. The method of claim 15, wherein the request from the consumer device includes a request for content not locally stored, and wherein the method further comprises:
  transmitting a request for the content not locally stored to a remote other content distribution device; and
  receiving the content not locally stored from the other content distribution device.

17. The method of claim 15, wherein the signal stream is received from the satellite via a preselected channel other than a broadcast channel.

18. The method of claim 15, wherein the short range wireless protocol is IEEE 802.11ac or IEEE 802.11n, and wherein the processor comprises multiple processors operating in a distributed processing environment.

19. The content distribution device of claim 1, wherein the processor comprises multiple processors operating in a distributed processing environment.

20. The content distribution device of claim 1, wherein the sporting event comprises a baseball game.

\* \* \* \* \*